Sept. 20, 1966                G. MAXEINER                3,273,924
                           BALL AND SOCKET JOINT
                           Filed Jan. 28, 1964
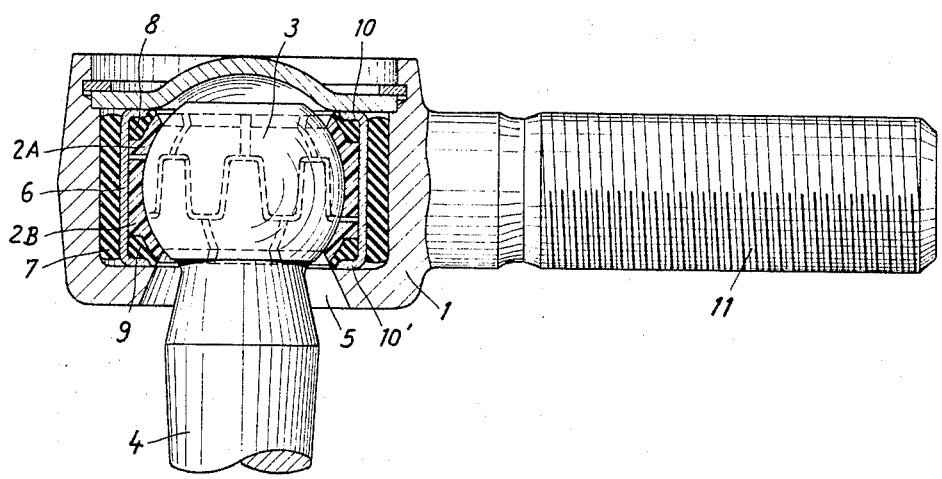

United States Patent Office 3,273,924
Patented Sept. 20, 1966

3,273,924
BALL AND SOCKET JOINT
Gottfried Maxeiner, Dusseldorf, Germany, assignor to A. Ehrenreich & Cie, Dusseldorf-Oberkassel, Germany
Filed Jan. 28, 1964, Ser. No. 340,727
Claims priority, application Germany, Jan. 29, 1963, E 24,249
2 Claims. (Cl. 287—90)

This invention relates to a ball and socket joint comprising a housing and a stud having a ball head which is received in the housing in a hollow spherical surface formed of cup-shaped members of synthetic material, and is more particularly concerned with a ball and socket joint which provides easy pivoting action without play, and which has an inherent resiliency which does not influence its pivoting or joint action.

It is generally desirable that the ball and socket joints of this type and elastically resilient. In this regard ball and socket joints are known in which the cups receiving the ball head are made of an elastic rubber material. In other types of ball joints rigid bearing cups are employed but they are arranged in a resilient manner in the joint housing.

In order to obtain a ball and socket joint which is substantially without play it is necessary that the elastic material employed to obtain the required resiliency be placed under a relatively large pre-tension. This in turn brings about an undesirably heavy pivot action of the ball joint because the pre-tension in the bearing structure acts against the ball head and thus impedes an easy movement of the ball head.

In order to avoid this disadvantage and to obtain a ball joint which is substantially without play while being easily pivotable and using a substantial pre-tension in the elastic material used to obtain the elasticity of the joint the bearing cups which form the hollow spherical surface receiving the ball head of the ball joint, and made of a synthetic material are lodged in a shell, and the shell is located in an elastic sleeve, preferably made of rubber, and pressed into the housing of the ball and socket joint.

With this arrangement the pre-tension imparted to the pressed-in elastic sleeve is absorbed by the shell and is not transmitted to the shells of synthetic material which form the bearing surfaces for the ball head and thus to the ball head itself. In this manner the ball and socket joint can have a desired ease of pivoting action and be nevertheless free of play and resilient.

The shell may be made of a rigid material such as metal. But it is also possible to employ a shell which is slightly resilient, for example a shell of a relatively strong metal weave or synthetic material of corresponding strength. In such a case the pre-tension is absorbed to a substantial degree by the shell. Due to the limited resiliency of the shell a portion of the force exerted by the pre-tension is transmitted to the bearing cups of synthetic material and maintains them in constant engagement with the ball head even after a wear of the bearing cups has taken place.

The shell edges may extend over the bearing cups on opposite sides. In this arrangement an elastic means such as a rubber ring may be arranged between the edges of the cups over which the shell edges extend and the flanged edges of the shell. The elasticity of the elastic means or of the rubber ring need not be particularly large because such an elastic member needs only to provide a balance of the play between the cups by displacing the cups in the axial direction of the joint stud.

These and other features of the invention will be apparent from the following detailed description of an embodiment of the invention, in combination with the accompanying drawing in which the single figure shows a vertical section of a ball and socket joint according to the invention.

The ball and socket joint illustrated consisted of a housing 1 at the end of a joint of a housing axle 11 and the joint stud 4, whose end carries the ball head 3 received in the joint housing. The housing opening through which the joint stud extends from the housing is indicated by numeral 5.

The ball head is received in the two bearing cups 2A and 2B of synthetic material whose opposed edges extend over the equator line of the ball head with reference to the axis of the joint stud, and mesh with each other in a tooth-like manner. This interengagement allows a balancing or equalization of the wear on the bearing cups by displacing the cups in the axial direction of the joint stud without producing a separation slot or gap between the two cups at the equator line of the ball head. By the fact that such a separation slot is not created this structure allows to absorb more effectively the stresses in the joint produced by forces acting on the joint transversely of the axis of the joint stud.

Both cups 2A and 2B are set into a shell 6. This shell 6 is received in a resilient sleeve 7 which is pressed into the chamber of the joint housing and consists of rubber, for example. The edges 10 and 10' are bent over on the bearing cups. Between the bent over edges 10 and 10' and the bearing cups a resilient means such as a rubber ring 8 and 9 is lodged. By bending over the edges 10 and 10' on the bearing cups the ball head, the bearing cups 2A and 2B, the rings 8 and 9, and the sleeve 6 form a closed joint unit.

What is claimed is:
1. A ball and socket joint comprising in combination
a stud having a ball head at one end,
a hollow housing having a bore extending therethrough, said housing having an inturned flange portion at one end of said bore defining an opening for said stud,
closure means for closing said housing at the other end of said bore,
bearing cups of synthetic material disposed against said ball head,
retaining ring means disposed around said bearing cups and positioned axially of said stud between said inturned flange portion and said closure means,
a resilient sleeve disposed between said retaining ring means and the inner wall of said housing, and said retaining ring means has an inturned flange at each edge extending over said bearing cups and an elastic rubber ring lodged between each inturned ring flange and the edge of the adjacent bearing cup.
2. A ball and socket joint comprising in combination
a stud having a ball head at one end,
a hollow housing having a bore extending therethrough, said housing having an inturned flange portion at one end of said bore and defining an opening for said stud,
closure means for closing said housing at the other end of said bore,
a pair of bearing cups of synthetic material disposed against said ball head,
a rigid ring member surrounding said bearing cups and having an inturned flange at each edge extending over said bearing cups,
a resilent annular member lodged between each inturned ring flange and the end of the adjacent cup member, said ring member being positioned between said inturned housing flange and said closure member,
and a resilient sleeve disposed circumferentially around said ring member and positioned between said ring member and the opposite inner wall of said housing.

(References on following page)

References Cited by the Examiner

UNITED STATES PATENTS

| | | | |
|---|---|---|---|
| 1,866,098 | 7/1932 | Graham | 287—93 |
| 2,288,160 | 6/1942 | Flumerfelt. | |
| 2,912,267 | 11/1959 | Latzen. | |
| 2,973,980 | 3/1961 | Vogt et al. | 287—87 |

FOREIGN PATENTS 1,116,190  1/1956  France.

CARL W. TOMLIN, *Primary Examiner.*

EDWARD C. ALLEN, *Examiner.*

A. V. KUNDRAT, *Assistant Examiner.*